July 23, 1957

H. A. HEDLAND 2,800,141

FLOW REGULATORS

Filed Jan. 7, 1953

INVENTOR
HARRY A. HEDLAND,

BY Roland E. Rehm

ATTORNEY

United States Patent Office 2,800,141
Patented July 23, 1957

2,800,141

FLOW REGULATORS

Harry A. Hedland, Evanston, Ill., assignor to William Waterman, Evanston, Ill.

Application January 7, 1953, Serial No. 330,005

4 Claims. (Cl. 137—484.2)

This invention relates to flow regulators having improved regulating characteristics. Improvement in regulation is obtained by employing the velocity energy of the fluid to counteract the inherent characteristic of regulators to reduce flow with increase in pressure. The high velocity fluid flow existing at the point where flow is throttled in the regulator is directed against the pressure responsive regulating element to aid the regulator spring and therefore reduce the throttling action of the regulator as the pressure difference increases.

The nature of the invention and further objects and advantages thereof will be readily apparent from the following description of one illustrative regulator embodying the invention and shown in the accompanying drawing.

Flow regulators are employed to maintain a uniform fluid flow despite variation in fluid pressure. They operate by throttling flow responsively to variation in pressure, or more correctly, variations in upstream and downstream pressure differences. In the conventional regulator, a piston or other valve is actuated against the resistance of a resilient element (usually a spring) by a pressure drop in the regulator orifice.

The valve controls a throttling port or ports which throttle flow through the regulator depending on the pressure drop in the regulator orifice. The high fluid velocity (increasing with increase in pressure) occurring at the throttling ports results in the characteristic region of low pressure (when pressure head is converted into velocity head) which heretofore has aided or supplemented the orifice pressure drop to produce an excessive deflection or displacement of the valve to reduce flow below the desired uniform flow rate. The greater the throttling in the regulator (resulting from increase in pressure), the greater the departure of the flow rate from the desired uniform flow rate.

In the illustrative regulator the effect of the low pressure region is compensated by the velocity energy of fluid. As here shown (see particularly Fig. 2) the fluid in the region where it is throttled by the regulator valve 10 is caused to travel in a direction (see arrow 11, Fig. 2) opposed to the throttling movement of valve 10, and at least a portion of the velocity energy of the fluid counteracts the tendency of the low-pressure region (existing where the pressure head is converted to velocity head) to increase the throttling movement of the valve. Ordinarily, a region of low pressure would have the same effect as an increase in pressure drop, because it would reduce the back pressure, and therefore correspondingly increase the pressure difference to which the regulator is responsive.

Figure 1:
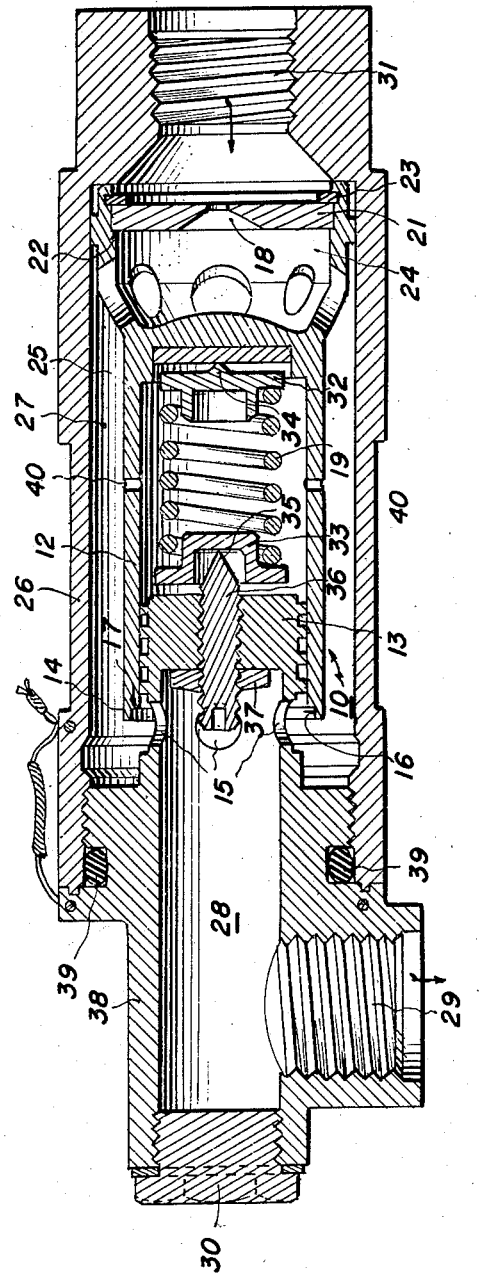
Fig. 1 is a longitudinal section of the regulator.
Figure 2:
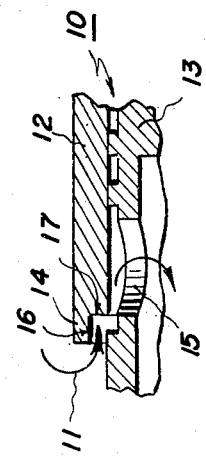
Fig. 2 is a fragmentary section on an enlarged scale illustrating the manner of utilising the high velocity of the fluid to resist the throttling action of the regulator.

The regulator valve 10 is here shown in the form of a relatively movable cylinder and piston 12 and 13. In this instance the cylinder is in effect a movable external piston 12 sliding over a stationary element 13 similar to a piston. Throttling is effected by the piston skirt 14, in this case, the extremity of the skirt which variably covers the throttling ports 15. The skirt is counterbored as at 16 to direct fluid flow as it reaches the throttling ports in a direction counter to the throttling movement of the piston 12 and to cause the fluid to impinge against the shoulder 17 on the piston and thus deliver to the piston 12 enough force to counteract the tendency of the low pressure region adjacent the throttling ports to increase the throttling movement of piston 12 (Fig. 2). Since the degree of reduction of effective pressure head and the aforesaid compensating force are both functions of the fluid velocity in the region of the throttling ports, the aforesaid compensating force is always sufficient throughout the normal range of pressure (pressure drop) variations. That is, it increases at the same rate the effective throttling force decreases below that necessary to maintain uniform flow. The resultant flow therefore remains uniform.

Pressure drop to provide a piston operating force responsive to variation in pressure is provided by a metering orifice 18 so located that the pressure drop tends to move the piston against the resistance of spring 19 to throttle ports 15. Orifice 18 is preferably made relatively large so that only a relatively small fraction of the total pressure drop (enough to operate the piston) occurs in orifice 18, the major pressure drop occurring at the throttling orifices 15. This minimizes the tendency of the fluid to by-pass orifice 18 by leaking around the piston. Orifice 18 is advantageously formed in a removable orifice plate 21 to facilitate adjustment of the regulator for different flow rates. The orifice plate is advantageously seated against a shoulder 22 in the piston and held in place by spring retaining ring seated in groove 23 in the piston.

The forward end of the piston is enlarged as at 24 and guided in cylinder 25 comprising the interior of the regulator housing 26. The enlarged portion 24 is provided with a series of large openings through which flow reaches the annual space 27 (between the piston body and the walls of cylinder 25) and by which it is conducted through the throttling ports 15. Flow passing through the latter leaves the regulator through the large central bore 28 in the regulator body and leaves the latter through outlet 29. The outlet is advantageously offset from the bore of the regulator body to permit access to the interior of the body (by removing plug 30) for adjustment and replacement, without disconnecting the regulator from the line in which it is connected at outlet 29 and inlet 31.

It will be noted that the external type of piston makes it possible to provide a flow passage through the regulator of maximum size and capacity in relation to the overall diameter of the regulator.

Spring 19 is provided with compensating seats 32 and 33 having point bearings 34 and 35 which prevent any binding of the piston by the spring, since binding force cannot be transmitted from the spring. Bearing point 35 is provided by an adjustable screw 36 accessibly upon removal of plug 30 for adjustment of the spring loading and therefore of the flow rate. In adjusted position the screw is secured by lock nut 37.

Regulator body 26 is closed at the end by the fitting 38 which carries outlet 29 and access plug 30. It is threaded into the body and sealed by O-ring 39.

One or more holes 40 are formed in piston 12 to equalize pressures inside and outside the piston.

Obviously the invention is not limited to the details of the illustrative regulator, since these may be variously modified. Moreover, it is not indispensable that all features of the invention be used conjointly, since various features may be used to advantage in various combinations and sub-combinations.

Having described my invention, I claim:

1. A flow regulator comprising a housing having inlet and outlet and a fluid passage connecting inlet and outlet, a port in said passage, a pressure responsive valve variably throttling said port in response to pressure variations, a spring resisting movement of said valve, a portion of said passage upstream of said port having a surface independent of said valve for directing flow toward said valve in a direction to aid said spring, and throttling means upstream of and independent of said port for increasing the velocity of flow as it approaches said port and directing the same against the valve to oppose movement of the latter and to supplement the action of said spring.

2. A flow regulator comprising a housing having inlet and outlet and a fluid passage connecting inlet and outlet, a port in said passage, a valve movable by and in the direction of flow in response to pressure variations for throttling said port, a spring resisting movement of said valve, a portion of said passage upstream of said port having means independent of said valve for directing flow toward said port, and means in the path of said directed flow and adjacent but upstream of said port for throttling said directed flow to increase its velocity and causing it to impinge on said valve at a point upstream of said port and in a direction opposed to throttling movement of said valve so as to supplement the force of said spring.

3. A flow regulator comprising in combination a housing having inlet and outlet, a cylinder, a valve, said cylinder and valve exposed to fluid pressure and slidable one within the other, one having a cylindrical skirt and the other having a port throttled by said skirt, resilient means resisting throttling movement of said valve and skirt, a flow passage in said housing leading from said inlet to said port, a portion of said skirt adjacent but upstream of said throttled port being spaced therefrom to form a shoulder and to form a constricted fluid passage smaller than said flow passage for increasing the velocity of flow and leading the same to said port in a direction opposed to the throttling movement of said valve and directing said flow against said shoulder so that the increase in kinetic energy of flow resists throttling movement of said valve.

4. A flow regulator comprising in combination a housing having inlet and outlet, a cylindrical valve slidable in said housing and having a skirt spaced from said housing to provide a flow passage communicating with said inlet, said valve being exposed to and movable by fluid flow in the direction of flow and having an orifice to pass flow from said inlet to said passage, said orifice being restricted to create a pressure drop for actuating said valve, a stationary member inside said cylinder and having a port passing flow from said passage to said outlet and throttled by movement of said skirt responsive to variations in fluid pressure, said skirt being counter-bored adjacent but upstream of said port to form a shoulder and to form a deflecting flange comprising a restricted passage smaller than said flow passage upstream of said shoulder for throttling and thereby increasing the velocity of flow and directing the same against said shoulder to resist movement of said valve, and a spring counter-balancing said valve against said fluid flow.

References Cited in the file of this patent

UNITED STATES PATENTS

| | | |
|---|---|---|
| 1,907,162 | Webb | May 2, 1933 |
| 2,198,487 | Sisk | Apr. 23, 1940 |
| 2,321,573 | Chace | June 15, 1943 |
| 2,351,035 | Grant | June 13, 1944 |
| 2,353,191 | Samiran | July 11, 1944 |
| 2,584,418 | Branson | Feb. 5, 1952 |